July 24, 1962 C. R. ANDERSON 3,046,212
NUCLEAR REACTOR

Filed April 14, 1959 5 Sheets-Sheet 1

INVENTOR.
Cleve R. Anderson
BY
Roland A. Anderson
Attorney

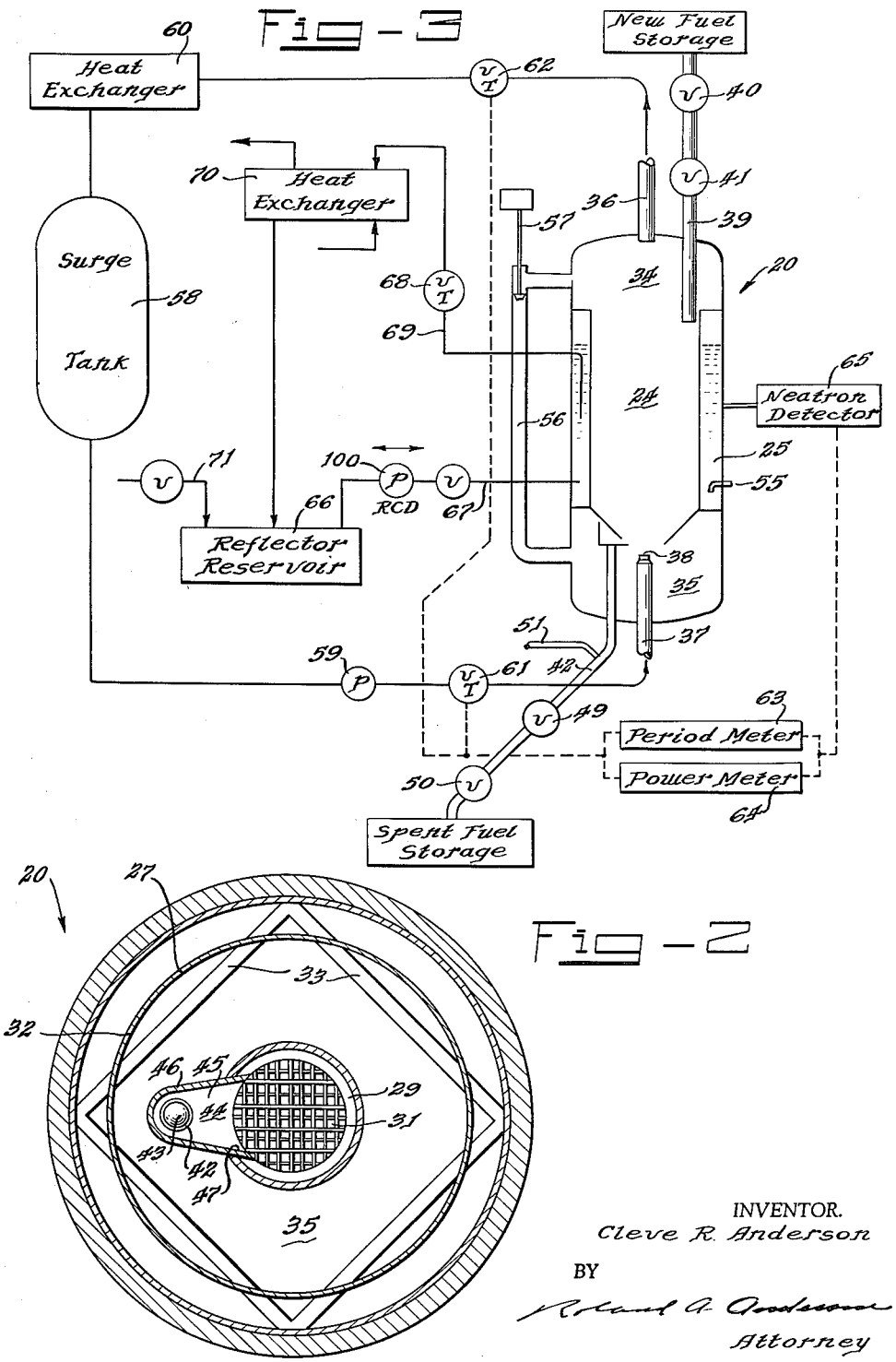

July 24, 1962　　　　　　C. R. ANDERSON　　　　　3,046,212
NUCLEAR REACTOR
Filed April 14, 1959　　　　　　　　　　　　　5 Sheets-Sheet 3

INVENTOR.
Cleve R. Anderson
BY
Attorney

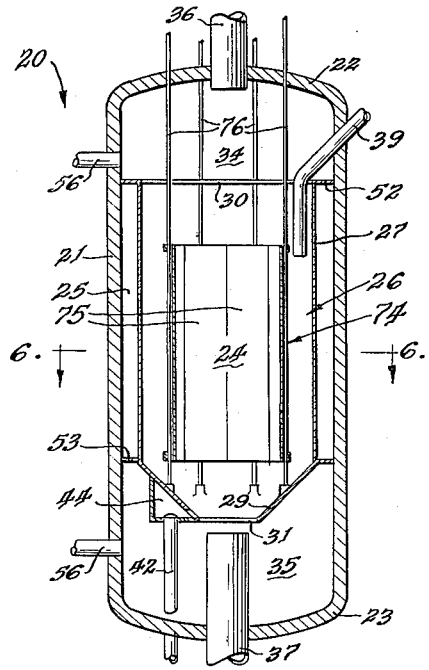
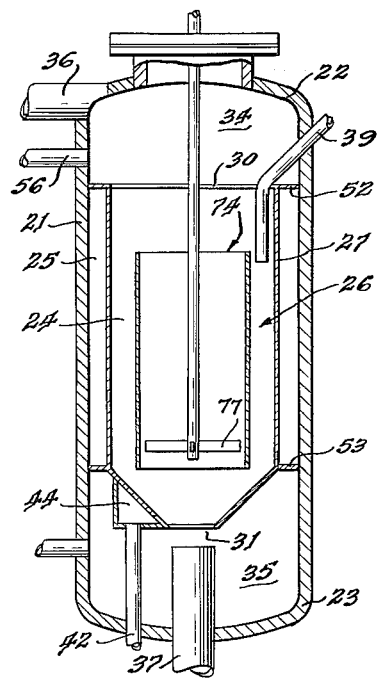
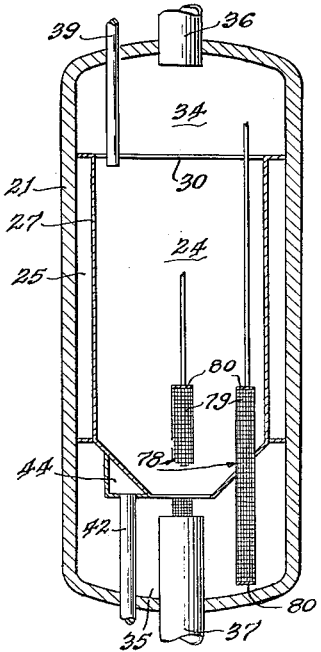
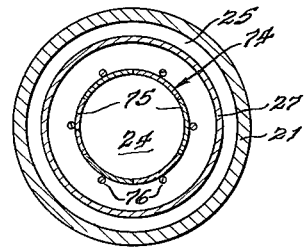
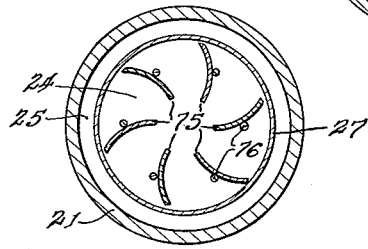

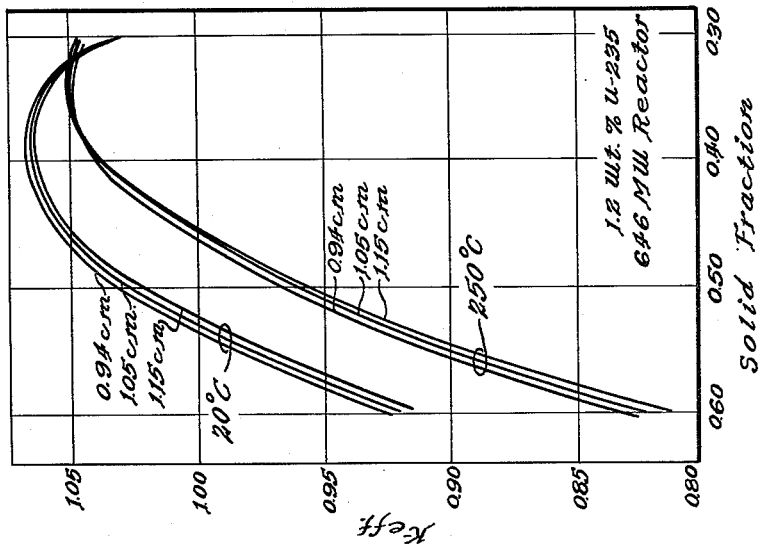
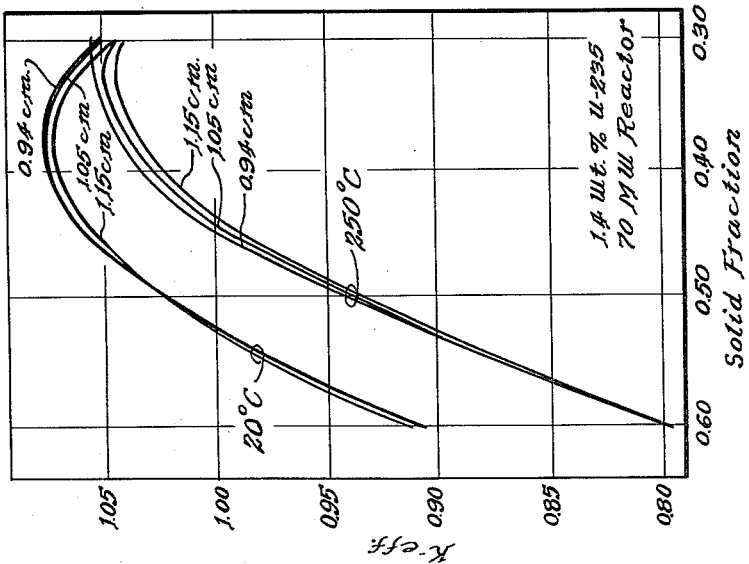

United States Patent Office 3,046,212
Patented July 24, 1962

3,046,212
NUCLEAR REACTOR
Cleve R. Anderson, Pasco, Wash., assignor to the United States of America as represented by the United States Atomic Energy Commission
Filed Apr. 14, 1959, Ser. No. 806,406
11 Claims. (Cl. 204—193.2)

This invention relates generally to nuclear reactors. In more detail the invention relates to thermal nuclear reactors which may be controlled by varying the fuel-to-moderator ratio within the active portion of the reactor.

Control of nuclear reactors is usually accomplished by addition or removal of (1) fuel, (2) moderator, (3) reflector, or (4) a neutron absorber. Each one of these methods has been used or proposed for use in nuclear reactors. The reactor according to the present invention varies from these old methods of control in that nothing need be added to or removed from the reactor core. Rather the relative proportions of moderator and fuel within the reactor core are varied by controlling the degree of separation of the fuel bodies.

It is known that the reactivity of a thermal nuclear reactor depends on the relative proportions of fuel and moderator within the active portion thereof. As is illustrated in Fermi et al. Patent 2,708,656, dated May 17, 1955, there is one volume ratio of fuel to moderator for fuel elements of a given size at which reactivity of the reactor is at a maximum. If the fuel-to-moderator volume ratio be increased from this ratio, the reactivity of the reactor will decrease, and, likewise, if the fuel-to-moderator volume be decreased, the reactivity of the reactor will decrease. This effect is progressive so that noncritical conditions can be reached in either direction. It will be understood that this applies no matter what the moderator and regardless of whether natural uranium, $U^{235}$, or other fissionable material be used.

Although it would not be impossible to control a nuclear reactor in which the fuel and moderator are both solids by varying the fuel-to-moderator ratio, the invention relates more specifically to nuclear reactors which include a liquid moderator. The invention covers broadly both organic moderators and water, the term "water" including both light water ($H_2O$) and heavy water ($D_2O$).

Homogeneous and heterogeneous reactors are well known in the art at present and the advantages and disadvantages of each are quite well known. In order to obtain insofar as possible the advantages of both types of reactor and to construct a reactor which is susceptible of control by varying the fuel-to-moderator ratio, the invention relates specifically to fluidized-bed, liquid-moderated reactors.

One of the more important aspects of the present invention relates to a method and means for operating a fluidized-bed reactor in such a way that a bed of fuel particles is obtained in which the particles are relatively uniformly distributed.

It is accordingly an object of the present invention to develop a novel nuclear reactor.

It is a further object of the present invention to develop a nuclear reactor embodying most of the advantages of heterogeneous and homogeneous reactors.

It is also an object of the present invention to develop a novel method of operating a nuclear reactor.

It is a more specific object of the present invention to develop a method of operating a nuclear reactor which does not require the use of absorber control.

It is another object of the present invention to develop a nuclear reactor in which primary control is had by varying the fuel-to-moderator ratio within the reactor core.

It is yet another object of the present invention to develop a nuclear reactor embodying a suspension of solid fuel pellets in water as the reactor active portion.

It is an additional object of the present invention to develop a nuclear reactor in which control of the reactor is had by expanding and contracting the active portion thereof.

One more object of the present invention is to develop a method of operating a suspended-pellet, water-moderated nuclear reactor whereby a uniform suspension capable of maintaining a uniform neutron flux is obtained.

According to the present invention nuclear reactors which embody my invention include an active portion consisting of substantially uniformly-sized fuel pellets suspended in a liquid moderator. Control of the reactor is obtained by varying the fuel-to-moderator ratio within the active portion of the reactor. The fuel-to-moderator ratio may be varied in any one or a combination of several ways all of which come within the scope of my invention:

(a) Varying the rate of flow of the water which maintains the pellets in suspension;

(b) Varying the amount of mechanical agitation used to maintain the pellets in suspension; and (c) Introducing moderator rods, which may be made either of a solid moderating material or as columnar baskets constructed of screen of mesh size small enough to exclude fuel pellets, into the active portion of the reactor.

In addition a particularly important aspect of the present invention arises in operation of the first of the above-mentioned embodiments of the invention. It will be understood that the reactor comprises a mass of uniformly-sized fuel pellets held in suspension by the upward flow of a fluid therethrough. This type of system may be described as follows: With low superficial velocity the fluid flows through the interstices of the bed and the solids remain fixed in position. At some higher velocity there is a shifting of the solids with a slight increase of bed volume and the frictional drag on each solid particle becomes high enough to support it without contact with other particles. Since the particles forming the bed are separated by fluid, the bed is unable to resist a shearing force and behaves as a liquid.

Such systems are known as fluidized beds. Most attention in the past has been paid to systems in which the fluid is a gas. However the terminology is also applicable to systems fluidized by a liquid. In normal operation of a fluidized bed a violent boiling action is desired to obtain the ultimate in contact between fluid and solid. Although "channeling" and "slugging" are undesirable phenomena—"channeling" being defined as the passage of columns of fluid smaller in diameter than the bed through the bed, leaving much of the bed undisturbed, and "slugging" is defined as the phenomenon occurring when bubbles, or discrete pockets of fluid, pass through the bed so that the bed expands and contracts convulsively—some nonuniformity can be tolerated in most operations with fluidized beds which have been described in the literature. It will be at once apparent to one skilled in the design of nuclear reactors that any great amount of nonuniformity of this sort in the core of a nuclear reactor cannot be tolerated, since there would be widely oscillating reactivity in the reactor, and wide temperature cycling within the individual fuel pellet.

It has been discovered that a bed of high-density particles can be uniformly fluidized by a flow of water upwardly therethrough provided the bed is operated under hindered-settling conditions. By hindered-settling conditions is meant conditions whereby the fall of particles through the bed under the influence of gravity is hindered by a mass of particles in suspension. A description of a specific means for obtaining hindered-settling conditions and a more specific description of the behavior of such a bed is given later in the specification.

The invention will next be described with reference to the accompanying drawings wherein:

FIG. 2 is a horizontal cross-sectional view taken along the line 2—2 of FIG. 1;

FIG. 3 is a diagrammatic view of a system including my novel nuclear reactor;

FIG. 5 is a diagrammatic vertical cross-sectional view of another modification of my reactor;

FIG. 6 is a diagrammatic horizontal cross-sectional view of the modification of FIG. 5 taken along the line 6—6 of FIG. 5;

FIG. 7 is a diagrammatic horizontal cross-sectional view of the same modification with the baffles differently arranged;

FIG. 8 is a diagrammatic vertical cross-sectional view of still another modification;

FIG. 9 is a vertical cross-sectional view of still another modification; and

Figure 10:
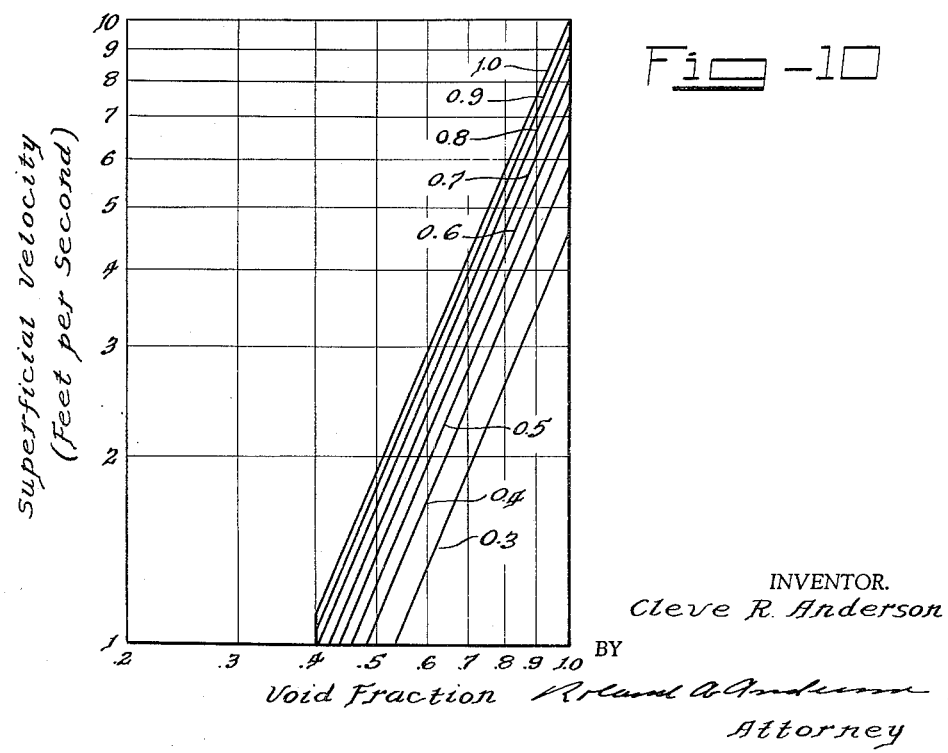

FIGS. 10, 11 and 12 of the drawing are graphs which illustrate how the specific reactors disclosed can be controlled.

A reactor constructed according to the present invention will next be described referring to FIGS. 1 and 2 of the drawing for details thereof. The reactor comprises a reactor vessel 20, formed of an outer cylindrical shell 21 and upper and lower dished heads 22 and 23, active portion 24 in the vessel, and annular reflector 25 surrounding the active portion. The reactor is, as usual, enclosed in a suitable shield (not shown).

Active portion 24 is enclosed by a cage 26 formed of an inner cylindrical shell 27, which is concentric with cylindrical shell 21 and has a conical or funnel-shaped portion 29 on the lower end of the inner shell 27, and upper and lower gratings 30 and 31 respectively. As is apparent from the drawing, active portion 24 is separated from the reflector 25 by inner shell 27, which is supported by a cylindrical, perforated support ring 32 resting on support beams 33 which are fixed to the reactor vessel 20.

Upper and lower gratings 30 and 31 separate outlet and inlet chambers 34 and 35 from active portion 24. Outlet chamber 34 is formed by upper grating 30, upper head 22, and a contiguous portion of outer shell 21. Inlet chamber 35 is formed by lower grating 31, lower head 23, funnel 29 and a contiguous portion of outer shell 21. An outlet line 36 penetrates the upper head 22 at about the center line of the reactor vessel 20 so as to be connected with the outlet chamber 34. An inlet line 37 penetrates the lower head 23 at about the center line of the reactor vessel 20 and extends upwardly into the inlet chamber 35 to terminate in a nozzle 38 located just below lower grating 31.

The active portion 24 contains fuel consisting of pellets of a neutron-fissionable material clad in a corrosion-resistant material of low neutron-capture cross section. The fuel may be, for example, uranium or a compound thereof enriched in $U^{235}$ or an alloy of uranium and plutonium. The cladding material may be aluminum, zirconium or alloys thereof.

Fuel is introduced into the reactor through feed line 39. Feed line 39 penetrates the upper head 22 at a point about halfway between the center line of the reactor and the edge of the reactor and extends through the outlet chamber 34 and the upper grating 30 into the active portion 24 of the reactor. Feed line 39 includes two gate valves 40 and 41. Fuel can be added to the active portion 24 during operation of the reactor. Fuel in pellet form is introduced downwardly through valve 40 into the section of the feed line 39 between valves 40 and 41 while gate valve 41 is closed; then valve 40 is closed and valve 41 is opened, whereupon the fuel pellets will drop into the active portion 24 of the reactor. As will become apparent hereinafter, the fuel is introduced into a part of the reactor where the general flow of fuel pellets is down so that the new fuel enters the bed of fuel pellets smoothly without violent collisions and against a relatively low pressure head.

Fuel is removed from the reactor through fuel-discharge line 42 which is equipped with poppet valve 43. Discharge line 42 is located away from the center line of the reactor and penetrates lower head 23 and inlet chamber 35 and communicates with fuel-discharge chamber 44 located below lower funnel-shaped portion 29 of inner shell 27. Fuel-discharge chamber 44 is formed of part of lower funnel-shaped portion 29 of inner shell 27, an imperforate extension 45 of lower grating 31 and a U-shaped vertical baffle 46. At the fuel-discharge chamber 44, lower funnel-shaped portion 29 of inner shell 27 does not extend all the way to grating 31 thereby leaving a fuel-discharge port 47 connecting fuel-discharge chamber 44 with active portion 24. By and between baffle 46 and portion 29 of inner shall 27 a circulation port 48 is formed, which permits free circulation of the moderator-coolant through fuel-discharge chamber 44.

Fuel-discharge line 42, which contains two gate valves 49 and 50, serves as the inlet for make-up coolant-moderator. The latter is admitted to line 42 through pipe 51, connected thereto at a region between the valve 49 and the lower head 23.

Fuel is discharged by opening poppet valve 43, permitting the fuel balls to drop into fuel-discharge line 42, and then alternately opening gate valves 49 and 50. The make-up coolant may be used to cool the discharged fuel.

An imperforate annular plate 52 forms an extension of upper grating 30 between inner shell 27 of cage 26 and shell 21 of reactor vessel 20 and an imperforate annular plate 53 is disposed between inner shell 27 of cage 26 and shell 21 of reactor vessel 20 at the top of funnel-shaped portion 29 of shell 27. Annular plates 52 and 53 together with cylindrical shell 21 and inner shell 27 completely enclose reflector 25. Reflector 25 is provided with reflector inlet line 67 and reflector outlet line 69. A level sensing tube 55 is also shown in FIG. 1.

A by-pass line 56, provided with a spring-loaded valve 57, connects outlet chamber 34 with inlet chamber 35. This line by-passes moderator-coolant around active portion 24 of the reactor when, for example, a signal from a conventional safety circuit opens valve 57. Loss of coolant-moderator automatically scrams the reactor without requiring a signal from the safety circuit.

In operation, active portion 24 of the reactor is filled with the requisite number of fuel pellets through feed line 39. As long as these pellets are unmoderated, it is impossible for the mass of fuel within the active portion 24 to go critical. Coolant-moderator is then admitted to the reactor vessel 20 by inlet line 37. The coolant-moderator flows into active portion 24 through lower grating 31. The velocity of this liquid is then raised until it is sufficient to lift some of the pellets in the active portion. At low flow rates the bed remains collapsed and the enrichment of uranium is such that the reactor is subcritical due to lack of sufficient moderation. As the flow rate of the coolant is increased, the bed volume increases, the fuel pellets move and circulate (become fluidized), and the volume of moderator per unit volume of fuel increases. As a result of the change in volume ratio of moderator to fuel, the reactor becomes critical.

To maintain the reactivity in the reactor, some of the fuel pellets in the reactor will be removed through fuel-discharge line 42 and additional fuel pellets introduced through feed line 39. Fuel lifetime will be about one year. However, it will not be possible to remove only those pellets which have been in the reactor for their full life since removal is random. In order to make most efficient use of the fuel, low-exposure balls are separated from high-exposure balls and returned to the reactor. One method of sorting the irradiated balls is to pass them individually or in groups past a gamma-ray counter and return low-exposure balls to the reactor. Another method of sorting the irradiated balls is to take advantage of the difference in density between high-exposure balls and low-exposure balls. The balls which have been in the reactor the longest have the highest density since the relatively light aluminum cladding has been partially corroded from the ball. At the end of a year the difference in specific gravity is great enough that the balls can be separated by density difference.

Low-exposure balls, along with enough new balls to maintain the reactivity of the reactor, will be returned to the reactor. High-exposure balls may be treated by conventional chemical procedures to recover the plutonium and remaining uranium free of fission products.

Operation of the reactor in more detail will next be described in connection with FIG. 3. The moderating coolant is pumped from surge tank 58 by pump 59 through inlet line 37 and nozzle 38 into inlet chamber 35 of reactor vessel 20. This coolant flows upwardly through the fuel bed in active portion 24 of the reactor, causing the required fluidization and serving as moderator while removing heat from the fuel balls. It passes out of the reactor vessel 20 through outlet line 36 to primary heat exchanger 60 giving up its heat to a secondary coolant which is used for the production of useful power. From primary heat exchanger 60 the coolant is returned to surge tank 58.

Primary reactivity control is effected by throttling the flow of the coolant-moderator circuit, thus changing the moderator-to-fuel ratio and neutron leakage from the reactor. As is shown in FIG. 3 the flow of coolant into and out of the reactor vessel 20 is regulated by either reactor period or neutron flux level through valves 61 and 62, located, respectively, in inlet line 37 and outlet line 36. Meters for these purposes are denoted 63 and 64, respectively, while a neutron detector is shown at 65.

Secondary control is obtained by control of the reflector height. This is accomplished by controlling the volume of reflector liquid pumped into reflector 25 through line 67 by means of a reversible pump 100 and the reflector liquid leaving the reflector 25 through line 69.

In operation the reflector liquid is pumped from reservoir 66 into reflector 25 at a desired rate by means of pump 100. The reflector liquid leaves the reflector 25 through 69 and passes through a throttle valve 68 to heat exchanger 70 where it is cooled and then returned to reflector reservoir 66. The height of reflector liquid in the reflector can then be controlled by means of throttle valve 68. To raise the height of reflector liquid in the reflector, throttle valve 68 is closed slightly to throttle down the flow of liquid from the reflector. It may be adjusted then to maintain a new level. To reduce the height of liquid in the reflector slightly throttle valve 68 is opened. To reduce the height of liquid rapidly reversible pump 100 is used to pump the liquid directly from the reflector 25 to the reflector reservoir 67.

Undesired changes in the liquid level are detected by level sensing tube 55. Conventional controls are used to return the level to its desired height.

The specific details of a 70-megawatt and a 646-megawatt reactor will next be given. Both reactors are light-water-cooled, moderated and reflected.

The fuel elements are roughly spherical pellets of uranium dioxide clad in .030 inch of an aluminum alloy containing from .5 to 2% nickel. Uranium dioxide is selected because of its stability to irradiation, heat loads, and high-temperature water. The cladding material is selected because of its low cost combined with relatively good resistance to corrosive attack by hot water.

It has been determined that it is not necessary that the fuel elements be of uniform size or exactly spherical shape since the fluidization characteristics of the reactor are not affected by variations therein and the physics of the reactor are not affected by minor variations from sphericity.

It is not believed that the fuel jackets must necessarily exhibit a 100% water-tight coating throughout their life, since uranium dioxide is quite corrosion-resistant of itself. It is, however, necessary that the jacket have no defects which would promote tearing away of the jacket from the fuel during operation.

The urania pellets forming the reactor fuel are pressed to shape in a hydrostatic press and sintered—a density of .93 times theoretical is used for this example. As has been stated, it is not essential that the shape be controlled very carefully. Therefore, preparation thereof does not raise any problems. The balls can be clad by a process similar to that used in fabricating bead chains. Balls are inserted into an aluminum tube and passed through a die forging machine in which the aluminum is mechanically sized to the ball diameter. The balls are thus spaced and linked by aluminum tubing. Individual balls are cut from the chain and the excess aluminum extending on two sides of the element is welded and pressed to the jacket giving a water-tight enclosure.

The reactor vessel 20 for the smaller reactor is 4 feet in diameter, 8.9 feet in height and is constructed of 1-inch thick stainless steel. The reactor vessel 20 for the larger reactor is 8.25 feet in diameter, 22.7 feet in height and also is constructed of 1-inch thick stainless steel.

Design criteria for both these reactors are given in the following table.

| | | |
|---|---|---|
| Thermal power, mw | 70 | 646 |
| Inside diameter of fluidized bed container, ft. | 4.0 | 8.25 |
| Height of fluidized bed, ft. | 7.90 | 21.7 |
| Volume of bed, ft.$^3$ | 99.3 | 1160 |
| Flow rate, lbs./hr | $5.976 \times 10^6$ | $26.09 \times 10^6$ |
| Flow rate, g.p.m. | 15,000 | 65,250 |
| Operating superficial velocity, ft./sec. | 2.65 | 2.72 |
| Fuel ball diameter (clad) inches | 0.887 | 0.965 |
| Operating solid fraction | 0.394 | 0.410 |
| Enrichment, percent uranium 235 | 1.4 | 1.2 |
| Density of canned fuel, gm./cc | 8.774 | 8.830 |
| Volume of fuel, ft.$^3$ | 39.12 | 475.6 |
| Number of fuel balls | 185,000 | $1.7476 \times 10^6$ |
| Reactor charge, lbs. of fuel | 21,418 | 262,000 |
| Reactor charge, lbs of $UO_2$ | 19,776 | 244,900 |
| Reactor charge, lbs of U | 17,430 | 215,860 |
| Specific power, mw./ton of U | 8.032 | 5.985 |
| Pressure drop across bed, p.s.i. | 10.9 | 31.1 |
| Pressure, outlet, p.s.i.a. | 1,250 | 1,500 |
| Saturation temperature at outlet pressure, ° F. | 572 | 596 |
| Inlet temperature, ° F. | 497 | 508 |
| Outlet temperature, ° F. | 530 | 575 |
| Temperature rise across reactor, ° F. | 33 | 67 |
| Thermal utilization, $f$, at operating point | 0.864 | 0.855 |
| Resonance escape probability, $p$, at operating point | 0.772 | 0.763 |
| Diffusion length squared, $L^2$, at operating point | 4.18 | 4.52 |

It is apparent that the primary advantage of the present reactor is the ease and simplicity with which it can be controlled. Normal day-to-day control of the reactor is obtained merely by varying the rate of coolant flow through the reactor.

FIG. 10 includes a family of curves for various ball diameters in centimeters, each coated with 30 mils of aluminum, and gives the relation between the superficial velocity of the coolant and the void fraction. Thus these curves show what coolant velocity should be used to obtain a desired void fraction for fuel elements of differing sizes.

FIGS. 11 and 12 correlate the solid fraction (one minus the void fraction) with the effective multiplication factor for various ball diameters (unclad) used as fuel at 20° C. and 250° C. in the two reactors specifically described. Restrictions on the application of these curves to an operating reactor are that the effective multiplication factor must be less than 1.00 when the bed is collapsed and the reactor is cold and clean, and that the point where the effective multiplication factor is equal to 1.00 plus xenon and samarium allowance (at hot, dirty operation) must lie below the peak of the curve on the tight-packed side. This latter is the fluidization point of operation, and, in order that incremental changes in fluidization around this point will cause a working change in the effective multiplication factor, this point must lie well off the flat portion of the curve. Subject to the above restrictions, it is clear that the described curves illustrate how varying the velocity of the coolant affects the reactivity of the reactor.

These curves may be used as a prediction of the effective multiplication during startup. Before fluidization, the bed has a random tight pack and is cold and initially clean. Tracing the cold curve, some fluidization will bring the reactor to criticality, or $k_{eff}=1.0$. Fluidizing to a slightly supercritical point on this same curve will allow a flux buildup and a power generation. As the core heats up, the reactivity begins to drop unless a greater lattice spacing is produced by increased fluidization. Thus, as the temperature builds up to that at normal operation, continued fluidization increase is necessary. This implies the motion of this startup point from the 20° C. curve, across a family of curves corresponding to all temperatures up to 250° C., all the while maintaining a constant reactivity. Graphically, this is a lateral movement from the cold, clean, slightly supercritcial point to the 250° C. curve. Then the reactivity can be set by further fluidization to cause the power to be raised on any period desired. As soon as the operating power (at 250° C.) is reached, the reactivity is dropped toward $k_{eff}=1.00$. The reactivity loss due to the negative temperature coefficient is now held in the increased lattice spacing.

On FIG. 11 the larger fuel spheres show a greater reactivity than smaller spheres with the same solid fraction (on the high $S_f$ side of the peak). This order is inverted on FIG. 12 for both temperatures shown. Since the only pertinent difference in the two sets of data which would affect the order of the curves is the core size, the difference observed is to be attributed to the effect of ball size on the nonleakage probability, which in turn depends also upon the buckling and hence upon the core size.

If the bed is fluidized to a point of operation at which the reactor is supercritical and this flow rate is maintained constant, the reactor power and temperature will rise on a period proportional to $k_{eff}-1$. The moderator density will decrease as the temperature rises, causing an instantaneous decrease in reactivity, since the core will have an effectively higher solid fraction. This is just as though the operating point moves (during a vanishingly small interval of time) to a lower solid fraction on the $k_{eff}$ curve corresponding to the temperature at this time. But this effect is a virtual increase in solid fraction since the actual volume ratio has not changed. However, after some time lag dictated by the inertia of the system, a real solid fraction increase will take place due to a change of the difference in densities between the fuel and the water, causing a somewhat slower decrease in $k_{eff}$. Although the reactor may remain supercritical after these two effects, the period of temperature rise will become longer than it would be without this buffering loop. Thus, the fluidized bed design presents a certain amount of self-regulation, and for low initial accidental values of $k_{eff}-1$, a fail-safe characteristic.

Immediately when fissions take place, xenon is generated and its concentration builds up as the power rises. This buildup takes place until the power level of normal operation is reached, and is continued for some time thereafter until, under a constant power, an equilibrium poisoning is maintained. During this xenon transient, fluidization must be increased still further to nullify the drop in thermal utilization and to maintain exact criticality. At the time when the xenon concentration reaches an equilibrium value, the fluidization of normal operation will have been reached. It is estimated that a 30 mk. (.030 in $k_{eff}$) allowance is necessary for xenon and samarium buildup. A 10 mk. control allowance may be handled by reflector height variation if needed. Subsequent transient effects due to fuel burnup and nonsaturable poison buildup will be compensated by varying the reflector height and causing a favorable change in the neutron leakage economy.

Another extremely important advantage of the described reactors is the uniformity of the bed of fuel particles in the fluidized state. As has been stated, this uniformity is obtained by operating the bed under hindered-settling conditions. To obtain hindered-settling conditions the water inlet must be so located as to obtain a peaked velocity profile. One means for accomplishing this is to employ a conical flow distributor and admit the water at the center thereof. The rising velocity of the water near the conical flow distributor is higher than it is near the top due to the conical shape near the bottom of the column. Consequently, particles which have fallen to a point approaching the conical distributor here meet greater resistance and some of them can fall no farther. Netiher can they rise. As a result, a mass of particles becomes trapped above the conical portion, and pressure builds up in the mass. Particles thereupon move upward along the path of least resistance which is usually the center of the column, until they reach a region of lower pressure at or near the top of the settled mass; here, under conditions under which they previously fell, they fall again. As particles from the bottom rise at the center, those from the sides fall into the resulting void. A general circulation is thus built up. This continual movement, with the particles at all times in intermittent light moving contact with neighbors, is called "Teeter." It is by setting up a "Teeter" column in the reactor that sufficient uniformity is obtained.

Figure 1:
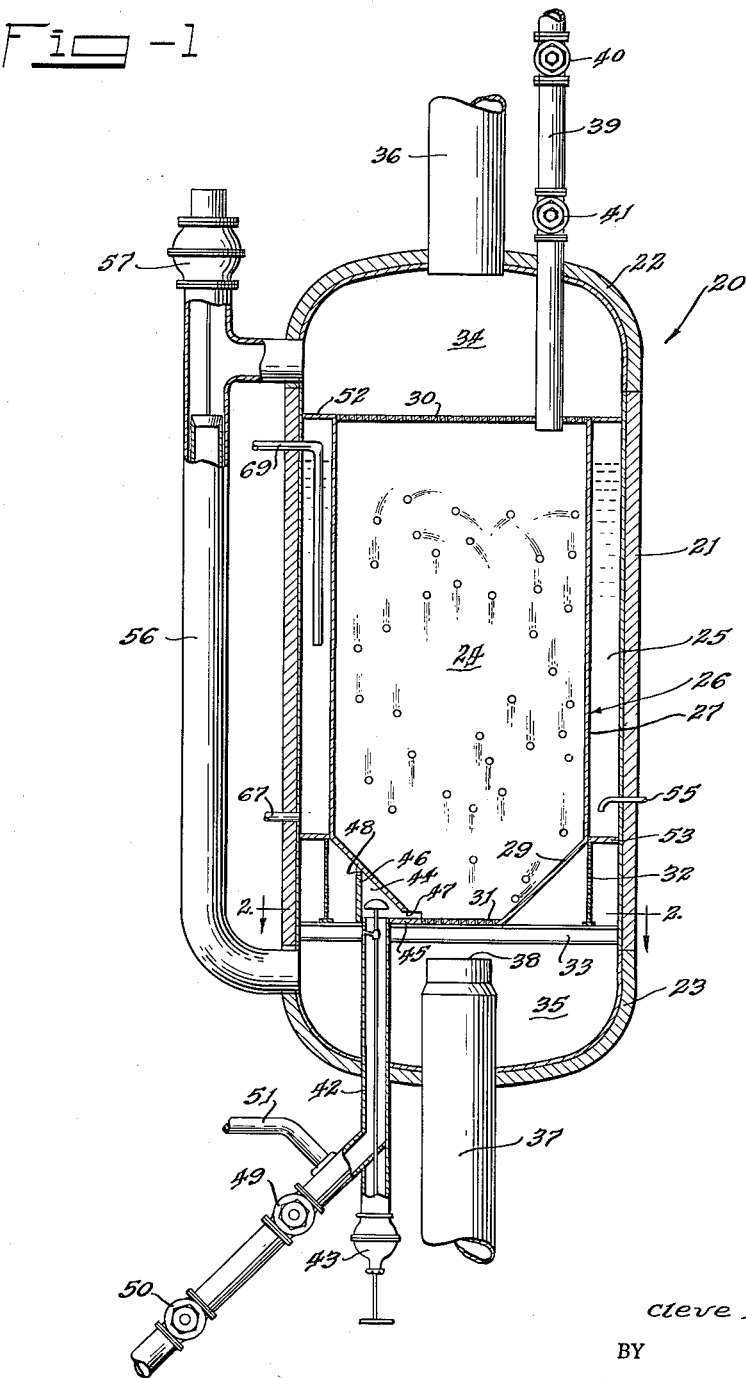
FIG. 1 is a vertical cross-sectional view of a nuclear reactor according to my present invention.

Referring to FIGS. 1–3 again, it is seen that fluid enters reactor vessel 20 through nozzle 38, located at the center of the reactor vessel, and elevates fuel pellets in the center of the reactor. The balls then return to the bottom of the vessel at the periphery thereof. This is known as the smoke-ring effect. This effect minimizes ball collisions and promotes smooth pellet circulation.

Use of a nozzle entrance allows particulate fluidization at all velocities except the very highest in contradistinction to aggregative fluidization. Aggregative fluidization is defined as fluidization in which the particles move in clusters, while particulate fluidization, as the name implies, is the condition in which particles move individually. The velocities required for reactor use are those within which particulate fluidization is obtained. On the other hand, a uniform velocity profile obtained with a plate-type distributor results in aggregative fluidization with void regions appearing in the bed.

These observations are the result of fluidization studies undertaken to study the parameters which influence solid dispersions in a solid bed and to correlate fluidization data pertinent to reactor design. Tests were carried out on two grades of solid steel balls, a ¾-inch ball made of chrome steel and a ⅜-inch ball of a lower grade of steel. Ball density was 485 pounds per cubic foot. Five different flow distributors were used: (a) A ⅛-inch plate by 8 inches O.D. drilled ⅛-inch on ¼-inch centers with 23% free area. (b) A ⅛ inch plate by 8 inches O.D. drilled 11/64 inch on 7/16-inch centers with 16% free area with a ½-inch thick by 13½ inches O.D. flange. (c) A conical nozzle distributor which was 4 inches in internal diameter at its narrowest and 5⅞ inches in inside diameter at its widest which contained a 4-inch diameter perforated plate at the narrow end of the cone. (d) A conical nozzle distributor which ranged in width from 6.387 inches internal diameter to 8.387 inches internal diameter which contained fourteen ½-inch pipe nozzles on 1½-inch centers grouped in the 6.387-inch narrow end of the cone. (e) A conical nozzle distributor which ranged from 4 inches internal diameter to 9 inches internal diameter and contained five ¾-inch tubing nozzles in a 2½-inch centrally located pipe with this nozzle being located in the narrow end of the cone.

The tests showed that ¾-inch balls in 9-inch pipes fluidized smoothly, without channeling flow or gross voids forming in the bed, when a conical flow distributor was used. Furthermore, bed smoothness persisted through a wide range of bed expansion, with fluidized heights from about 11 to almost 30 inches. On the other hand, fluidization with perforated flat-plate flow distributors produced severe turbulence or channeling in beds of both ⅜- and ¾-inch balls, with the exception of the ⅜-inch size in the 9-inch pipe at low expansions. The turbulence was marked by the formation of sizable voids in the beds and widely fluctuating bed interfaces. The conclusion was drawn from this series of observations that optimum uniformity is obtained with a bed of static depth approximately equal to the bed diameter and fluidized by a flow distributor of conical geometry.

Best results were obtained by using distributor (e) where the distributing nozzles are located as closely as possible to the center of a conical distributor. Distributors (c) and (d) also gave generally acceptable results but not as good as distributor (e).

Advantages of the described reactor will now be summarized.

(1) The reactor is self-scramming at a rapid rate upon accidental reduction of moderator-coolant flow since the loss of reactivity upon collapsing the fluidized bed at operating temperature is extremely rapid. This is because the high negative temperature of the active lattice causes the collapsed bed to have considerably less reactivity at operating temperature than at room temperature.

(2) The reactor has self-regulating tendencies due to the reactivity and fluidization changes resulting from a change in density of the moderator-coolant.

(3) A severe power excursion will be self-quenched by steam void formation.

(4) The reactor has excellent heat transfer properties.

(5) Fuel is exposed uniformly.

(6) The reactor has the reactivity advantage of heterogeneous reactors over homogeneous reactors and yet has the advantage that fuel can be continuously and easily charged and discharged.

(7) The reactor has the advantage that process piping is not needed and no control rods are needed.

Figure 4:
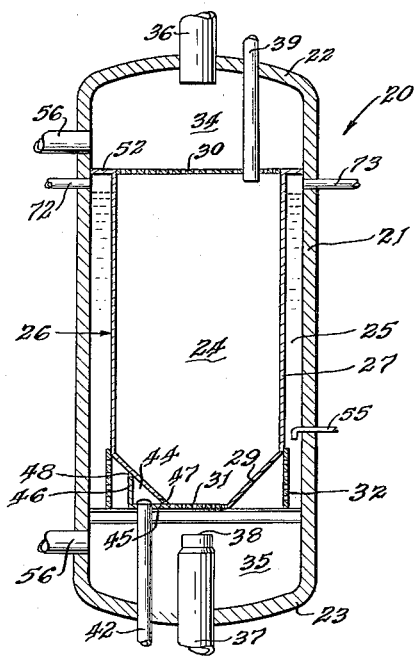
FIG. 4 is a diagrammatic vertical cross-sectional view of a modified form of a nuclear reactor according to my invention.

A modification of the invention is shown in FIG. 4 of the drawing. In this figure as in FIGS. 5–9, parts are given the same number as in FIGS. 1–3 where their function is unchanged. In this modification the same flow of liquid which serves as coolant-moderator serves as reflector liquid. It will be noted that annular plate 53 is not present in this modification so that there is communication between inlet chamber 35 and reflector 25. The only difference this makes in operation of the reactor is that a different method of reflector control is required. The height of the reflector is controlled by the pressures of helium thereabove. To supply the helium, helium inlet line 72 and helium outlet line 73 connected to the top of the reflector area 25 are provided. Control of the pressure of helium above the reflector liquid may be by conventional means. A change in this pressure obviously changes the level of the reflector liquid.

Another modification of the invention is shown in FIGS. 5, 6 and 7. FIGS. 5, 6 and 7 show a baffle 74, formed of vanes 75. Each vane 75 can be turned by a rod 76 so that the vanes 75 can be closed to form a tube as in FIG. 5 or opened as in FIG. 6.

The baffle 74 serves the purpose of separating the upwardly flowing fuel pellets at the center of the reactor from the downwardly flowing pellets at the periphery of the reactor. This accomplishes two things: It prevents violent head-on collisions between balls going in opposite directions in the reactor and it makes it possible to adjust the fuel-to-moderator ratio so that it is near optimum for high reactivity in the center of the reactor and near optimum near the periphery for plutonium production. In order to accomplish this, the bed is expanded in the center of the reactor so that near optimum reactivity is obtained. The pellets rising in the comparatively large central area of the reactor are crowded together in the smaller annular portion so that the moderator-to-fuel ratio is much lower. This makes the reactivity less in the annular portion but makes the plutonium conversion ratio higher. For example, the moderator-to-fuel ratio in the center of the reactor can be about 2:1 at the same time the moderator-to-fuel ratio is .4:1 in the annular portion. Having the vanes adjustable as shown makes it possible to operate the reactor as a single-zone or as a dual-zone reactor.

Another modification, not shown in the drawing, is a fluidized-bed reactor in which the moderator-coolant is admitted so that it passes up through the reactor near the periphery of the reactor vessel so that the fuel pellets drop downwardly at the center of the reactor. By this means the flux of the reactor can be flattened.

The modification of FIG. 8 includes a baffle or draft tube 74, as does the embodiment of FIG. 5. Rather than rely on the lifting force of water to expand the bed and thereby start and control the chain reaction, it includes an agitator 77 for this purpose. By rotation of the agitator 77 the bed of fuel pellets is expanded till the chain reaction starts. The fuel pellets then circulate up through the center of the reactor and down about the periphery thereof. Control of the reaction may be obtained by varying the amount of agitation from the mechanical agitator to control the moderator-to-fuel ratio within the reactor.

An additional embodiment is shown in FIG. 9. According to this embodiment the fuel-to-moderator ratio within the reactor is raised by moving baskets 78 constructed of screen of a mesh size such that the fuel elements cannot enter the basket into and out of the active portion of the reactor. This can be done when the particles are fluidized by the stream of water. The aforesaid baskets then afford an additional means for changing the fuel-to-moderator ratio in the reactor and can be used for that purpose. Baskets 78 may have only the sides 79 thereof constructed of screen and the ends 80 imperforate as shown, or the ends 80 may also be constructed of screen. The baskets may be of stainless steel and may be, for example, 4 feet long and 2 inches in width, with a sufficient number being used to obtain the effect desired.

An alternative means for obtaining about the same results is to move solid rods of a moderating material such as graphite into and out of the active portion of the reactor.

It will be understood that the invention is not to be limited to the details given herein but that it may be modified within the scope of the appended claims.

What is claimed is:

1. A nuclear reactor comprising a cylindrical pressure vessel, an active portion enclosed by a cage formed of an inner cylindrical shell having a funnel-shaped portion on the lower end thereof, and upper and lower horizontal gratings, pellets of thermal-neutron-fissionable material clad in a corrosion-resistant material disposed in a liquid moderator in said active portion, an inlet line for moderator penetrating the bottom of the pressure vessel, and terminating in a nozzle just below the center of the lower grating, an outlet line for moderator at the top of the pressure vessel, means for charging and discharging fuel pellets to the active portion of the reactor, and variable pumping means for varying the flow of moderator upwardly through the reactor.

2. A nuclear reactor according to claim 1 wherein the moderator is water, the thermal-neutron-fissionable material is uranium dioxide partially enriched in U-235, and the cladding is an aluminum-nickel alloy.

3. A nuclear reactor according to claim 2 wherein the outer portion of the pressure vessel surrounding the active portion constitutes a reflector and means are provided for varying the height of moderator in the reflector to control the reactor.

4. A nuclear reactor according to claim 3 wherein the reflector portion is enclosed at top and bottom by annular plates extending between the pressure vessel and the inner shell and the means for varying the height of moderator in the reflector are an inlet line and an outlet line for moderator, a reversible pump in the inlet line and a throttle valve in the outlet line.

5. A nuclear reactor according to claim 3 wherein the reflector portion is enclosed at the top by an annular plate extending between the pressure vessel and the inner shell and is open at the bottom and the means for varying the height of moderator in the reflector are an inlet and an outlet line for helium extending into the top part of the reflector and means for varying the pressure of helium above the reflector.

6. A nuclear reactor according to claim 3 wherein a by-pass line for moderator containing a spring-loaded valve extends around the active portion of the reactor.

7. A nuclear reactor according to claim 3 wherein the means for discharging fuel from the reactor comprises a discharge chamber under the funnel-shaped portion of the inner shell communicating with the active portion of the reactor by a slot at the bottom thereof, and a discharge pipe leading from the discharge chamber out of the reactor.

8. A nuclear reactor according to claim 7 and including an inlet line for make-up water connected to the discharge line whereby make-up water can be used to cool the fuel pellets being discharged.

9. A nuclear reactor according to claim 1 and including a cylindrical baffle concentric with the inner shell disposed in the active portion of the reactor to separate the pellets moving upwardly from those moving downwardly.

10. A method of operating a nuclear reactor comprising establishing and maintaining a fluidized bed of pellets of a neutron-fissionable material by flowing a liquid moderator upwardly through the center thereof at such a rate as to obtain particulate fluidization while constraining the lower portion of the bed into a conical shape so that the pellets rise in the center of the bed and fall in the outer portion of the bed.

11. A method of operating a nuclear reactor comprising establishing and maintaining a fluidized bed of pellets of a neutron-fissionable material operating under hindered settling conditions comprising flowing a liquid moderator upwardly through the center of the bed at such a rate as to obtain particulate fluidization while constraining the lower portion of the bed into a conical shape whereby the velocity of the liquid moderator is higher at the bottom of the bed than at the top of the bed, so that a mass of particles in the center of the bed above the bottom portion thereof is formed preventing particles in the center from falling back to the bottom of the bed whereby a general circulation of particles rising in the center and falling at the outside of the bed is established.

References Cited in the file of this patent

UNITED STATES PATENTS

| 2,816,068 | Ruano | Dec. 10, 1957 |
| 2,901,331 | Held et al. | Aug. 25, 1959 |
| 2,905,634 | MacLaren et al. | Sept. 22, 1959 |

FOREIGN PATENTS

| 749,064 | Great Britain | May 16, 1956 |
| 756,014 | Great Britain | Aug. 29, 1956 |